US010884840B2

(12) United States Patent
Puli et al.

(10) Patent No.: US 10,884,840 B2
(45) Date of Patent: Jan. 5, 2021

(54) CONTROLLED MONITORING BASED ON ROOT CAUSE ANALYSIS RECOMMENDATIONS

(71) Applicant: CA, Inc., New York, NY (US)

(72) Inventors: Ravindra Kumar Puli, Telangana (IN); Balram Reddy Kakani, Telangana (IN)

(73) Assignee: CA, Inc., New York, NY (US)

( * ) Notice: Subject to any disclaimer, the term of this patent is extended or adjusted under 35 U.S.C. 154(b) by 204 days.

(21) Appl. No.: 16/108,452

(22) Filed: Aug. 22, 2018

(65) Prior Publication Data

US 2020/0065173 A1 Feb. 27, 2020

(51) Int. Cl.
| | |
|---|---|
| *G06F 11/07* | (2006.01) |
| *G06F 11/30* | (2006.01) |
| *G06F 11/32* | (2006.01) |
| *G06F 16/901* | (2019.01) |

(52) U.S. Cl.
CPC ........ *G06F 11/079* (2013.01); *G06F 11/3072* (2013.01); *G06F 11/327* (2013.01); *G06F 16/901* (2019.01)

(58) Field of Classification Search
CPC .. G06F 11/079; G06F 11/3072; G06F 11/327; G06F 16/901; G06F 11/3048
See application file for complete search history.

(56) References Cited

U.S. PATENT DOCUMENTS

| | | | | |
|---|---|---|---|---|
| 2010/0332918 A1* | 12/2010 | Harnois | ............. | G06F 11/0766 714/57 |
| 2015/0095709 A1* | 4/2015 | Ramachandra | ..... | G06F 11/3604 714/38.1 |
| 2017/0116014 A1* | 4/2017 | Yang | ..................... | G06F 11/079 |
| 2018/0276063 A1* | 9/2018 | Mendes | ............. | H04L 41/0686 |
| 2019/0165988 A1* | 5/2019 | Wang | ................. | H04L 41/0631 |

OTHER PUBLICATIONS

Alexander La rosa, "Root Cause Analysis and Monitoring Tools: A Perfect Match," Pandorafms Monitoring Blog, Tech Feature, 7 pages, Nov. 16, 2017 https://blog.pandorafms.org/root-cause-anaysis/.

* cited by examiner

*Primary Examiner* — Kamini B Patel
(74) *Attorney, Agent, or Firm* — Shook, Hardy & Bacon L.L.P.

(57) ABSTRACT

Methods, root cause analysis (RCA) engines, and monitoring systems for controlling monitoring systems based on RCA are provided. An RCA engine of a hardware computer receives an alarm on an entity. The RCA engine fetches correlation domains based on the correlation domains each having been associated with the entity and in which the alarm is part of a policy applied to the correlation domains. The RCA engine determines if the alarm is for a root cause of failure for an entity in one of the correlation domains and responsive to the alarm being for the root cause of failure: transmits a message to monitoring systems, the message comprising instructions for the registered monitoring systems to stop monitoring symptom conditions associated with the root cause of failure, and transmits, through the network, an indication of a failure of the one of the entities that is the root cause of failure.

20 Claims, 11 Drawing Sheets

─ 300

Configuring the correlation domain based on accessing a topology data structure that defines a plurality of entities including the entity and an indication of connections existing between entities of the plurality of entities, wherein configuration of the correlation domain generates a correlation data structure identifying entities of the plurality of entities with indicated correlations to rules and a policy applied to the correlation domain

*FIGURE 3*

Configuring the correlation domain

─ 500 receiving configuration data through the network interface of the RCA engine

─ 502

Configuring the correlation domain based on the topology data structure and the configuration data

*FIGURE 5*

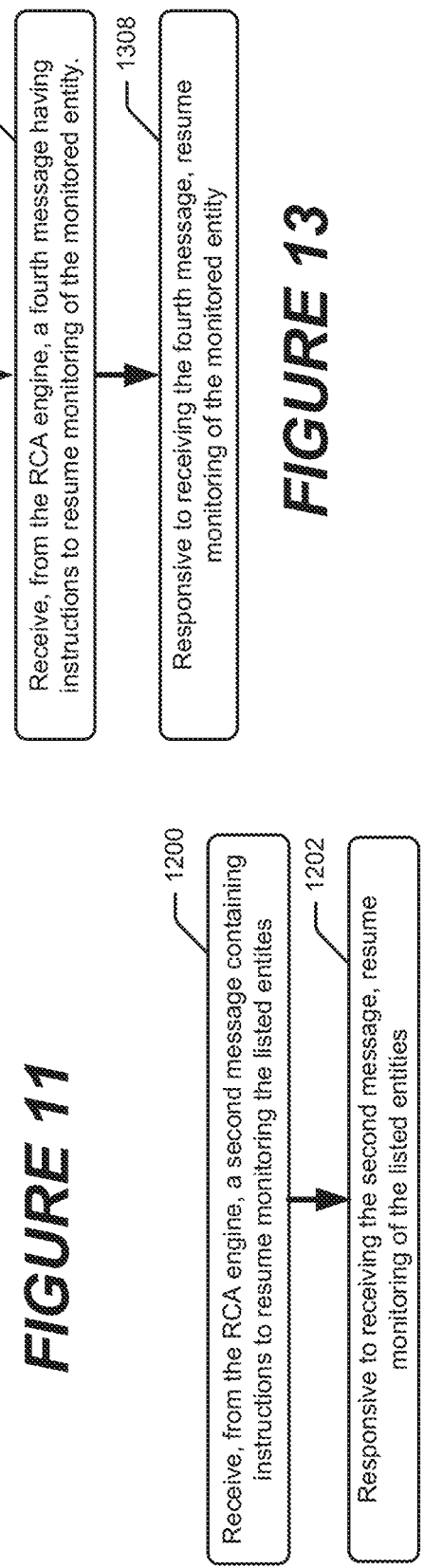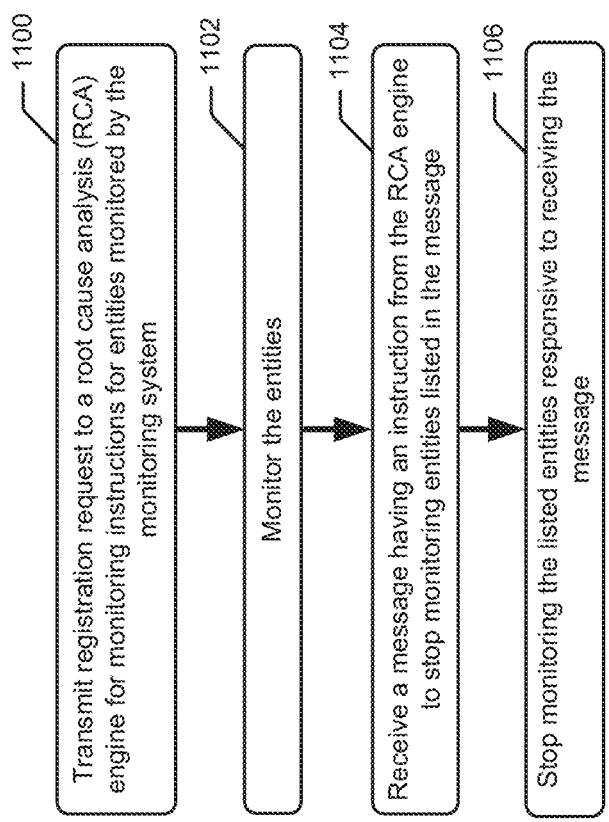

US 10,884,840 B2

CONTROLLED MONITORING BASED ON ROOT CAUSE ANALYSIS RECOMMENDATIONS

FIELD

Some embodiments described herein relate to root cause analysis, and in particular to controlling monitoring based on root cause analysis.

BACKGROUND

Monitoring systems monitor a set of entities at a defined frequency and publish metrics, topology of the set of entities being monitored, and events and alarms associated with the set of entities. These monitoring systems monitor their respective entities at configured intervals without knowledge of an actual situation occurring or a root cause of the actual situation, which can be outside the purview of the monitoring systems.

When a failure of a component or an input connection occurs, the monitoring systems that monitor entities affected by the failure of the component/input connect will continue to monitor the entities at configured intervals by trying to poll the entities and continuously fail to poll them and raise events/alarms at the configured intervals for the same situation until the root cause of the failure is resolved.

Issues that can occur as a result of the continual raising of events/alarms is unnecessary load on the networks used by the monitoring systems. When these monitoring systems are providing data to another monitoring system or manage or analytics platform, all of the events/alarms being sent at the configured intervals will be provided to the other monitoring systems/managers and/or analytic platform, leading to unnecessary loading of the networks used by the systems/managers and/or analytic platform.

SUMMARY

Some embodiments are directed to a method in a root cause analysis (RCA) engine of a networked hardware device for instructing registered monitoring systems to stop monitoring symptoms associated with a root cause of a failure. The method includes receiving an alarm on an entity. Correlation domains are fetched based on the correlation domains each having been registered as being associated with the entity and in which the alarm is part of a policy applied to the correlation domains. A determination is made if the alarm is for a root cause failure for one of the entities associated with one of the correlation domains. Responsive to the alarm being for a root cause of failure for the one of the entities associated with the one of the correlation domains, a message is transmitted, via a network interface, to registered monitoring systems for the one of the correlation domains, the message comprising an instruction for the registered monitoring systems to stop monitoring symptom conditions associated with the root cause of failure for entities in the one of the correlation domain.

The method may further include obtaining root causes of failures of the entities of the plurality of entities and indicated connections existing between entities of the plurality of entities. The method determines symptom conditions for each of the root causes of failures that are obtained. The method determines which one of the symptom conditions is a symptom condition of the entity of the plurality of entities having a failure that is the root cause. Rules are further based on the symptom conditions and the symptom condition of the entity having the failure.

The method may further include receiving a clear indication for a second alarm on a second entity. The method fetches second correlation domains based on the second correlation domains each having been associated with the second entity and which the second alarm is part of a second policy applied in each of the second correlation domains. The method determines if the second alarm is for a second root cause for an entity in one of the second correlation domains. Responsive to the second alarm being for the second root cause for the entity in the one of the second correlation domains, the method determines if the second root cause has been cleared and responsive to determining that the second root cause is cleared, transmits, through the network interface, a second message to registered monitoring systems for the one of the second correlation domains. The second message contains an instruction for the registered monitoring systems to restart monitoring symptom conditions associated with the second root cause for entities in the one of the second correlation domains.

Corresponding RCA engines of a hardware computer are disclosed. In some embodiments, the RCA engine includes a processor and a memory coupled to the processor, wherein the memory stores computer program instructions that are executed by the processor to perform operations that include receiving an alarm on an entity. The operations further include fetching correlation domains based on the correlation domains each having been associated with the entity and in which the alarm is part of a policy applied to the correlation domains. The operations further include determining if the alarm is for a root cause of failure for an entity in one of the correlation domains. The operations further include responsive to the alarm being for the root cause for the entity in the one of the second correlation domains, transmitting, via a network interface used by the RCA engine, a message to registered monitoring systems for the one of the correlation domains. The message contains instructions for the registered monitoring systems to stop monitoring symptom conditions associated with the root cause of failure for entities in the one of the correlation domains. The operations further include transmitting, through the network, an indication of a failure of the one of the entities associated with the one of the correlation domains that is the root cause of failure.

The RCA engine may further include for each correlation domain of the correlation domains, configuring the correlation domain based on accessing a topology data structure that defines a plurality of entities including the entity and an indication of connections existing between entities of the plurality of entities, wherein configuration of the correlation domain generates a correlation data structure identifying entities in the plurality of entities with indicated correlations and a policy applied to the correlation domain.

A monitoring system is also described. In one embodiment, the monitoring system includes a processor and a memory coupled to the processor, wherein the memory stores computer program instructions that are executed by the processor to perform operations including transmitting a registration request to a root cause analysis (RCA) engine for monitoring instructions for entities monitored by the monitoring system. The operations further include monitoring the entities. The operations further include receiving, from the RCA engine, a message having an instruction to stop monitoring entities listed in the message. The operations further include stop monitoring the listed entities responsive to receiving the message.

The monitoring system may perform further operations including receiving, from the RCA engine, a second message from the RCA engine containing instructions to resume monitoring the listed entities. The operations further include responsive to receiving the second message, resume monitoring of the listed entities.

It is noted that aspects of the inventive concepts described with respect to one embodiment may be incorporated in different embodiments although not specifically described relative thereto. That is, all embodiments or features of any embodiments can be combined in any way and/or combination. These and other objects or aspects of the present inventive concepts are explained in detail in the specification set forth below.

Advantages that may be provided by various of the concepts disclosed herein include reducing occurrence of events and alarms reported by monitoring systems, reducing load on the networks used by the monitoring systems and unnecessary loading of the networks used by the systems/ managers and/or analytic platform in which the events and alarms are sent.

Other methods, devices, and computer program products, and advantages will be or become apparent to one with skill in the art upon review of the following drawings and detailed description. It is intended that all such additional systems, methods, or computer program products and advantages be included within this description, be within the scope of the present inventive concepts, and be protected by the accompanying claims.

BRIEF DESCRIPTION OF THE DRAWINGS

The accompanying drawings are included to provide a further understanding of the disclosure and are incorporated in and constitute a part of this application. In the drawings:

FIG. 3 is a flowchart illustrating operations to configure a correlation domain according to some embodiments.

FIG. 5 is a flowchart illustrating operations to configure the correlation domain according to some embodiments.

FIG. 11 is a flowchart illustrating operations for a monitoring system to register with an RCA engine and to stop monitoring entities according to some embodiments.

FIG. 12 is a flowchart illustrating operations to resume monitoring of entities according to some embodiments.

FIG. 13 is a flowchart illustrating operations to stop and resume monitoring of a monitoring entity according to an embodiment.

DETAILED DESCRIPTION OF EMBODIMENTS

Figure 1:
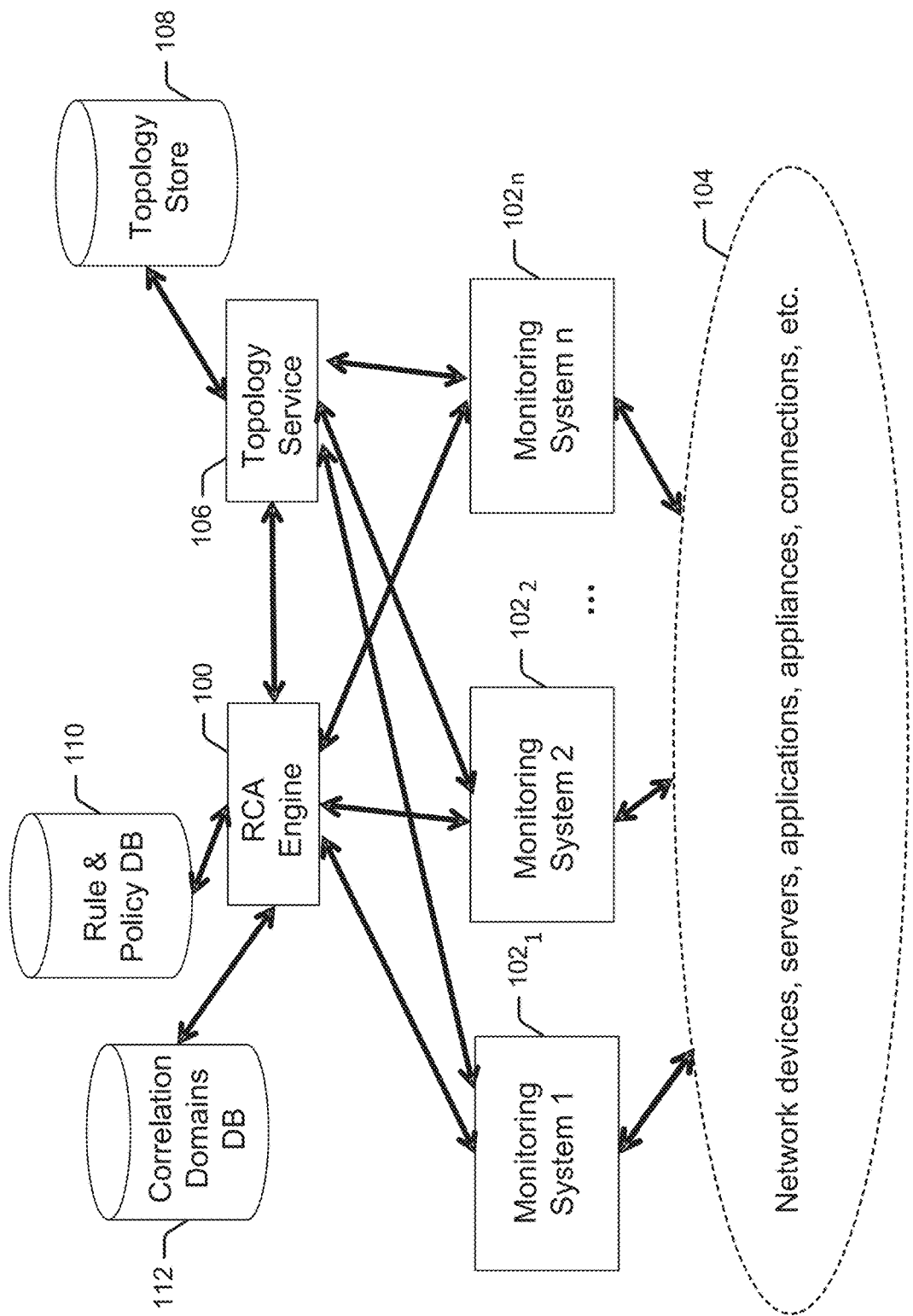
FIG. 1 is a block diagram illustrating an exemplary environment of a RCA engine communicating with monitoring systems and a topology service according to some embodiments.

Embodiments of the present inventive concepts now will be described more fully hereinafter with reference to the accompanying drawings. Throughout the drawings, the same reference numbers are used for similar or corresponding elements. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concepts. As used herein, the term "or" is used nonexclusively to include any and all combinations of one or more of the associated listed items.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes" or "including" when used herein, specify the presence of stated features, integers, steps, operations, elements, or components, but do not preclude the presence or addition of one or more other features, integers, steps, operations, elements, components, or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments described herein provide methods or RCA engines for controlling a monitoring system to stop and resume monitoring. According to some embodiments, a RCA engine receive an alarm on an entity. Correlation domains are fetched based on the correlation domains each having been associated with the entity and in which the alarm is part of a policy applied to the correlation domains. A determination is made of whether the alarm is for a root cause failure for one of the entities associated with one of the correlation domains. Responsive to the alarm being for a root cause failure for the one of the entities associated with the one of the correlation domains, a message is transmitted, via a network interface, to registered monitoring systems for the one of the entities associated with the one of the correlation domains, the message comprising an instruction for the registered monitoring systems to stop monitoring symptom conditions associated with the root cause of failure for the one of the entities associated with the one of the correlation domain.

FIG. 1 is a block diagram illustrating an environment for controlling monitoring systems according to an embodiment. As shown, a root cause analysis (RCA) engine 100 communicates with monitoring systems $102_1$, $102_2$, ... $102_n$ (collectively monitoring systems 102 or individually monitoring system 102) that monitors entities 104 such as network devices, servers, applications, appliances, connections, etc. The communication may be through a local network, the Internet, or a combination of the local network and the Internet. The monitoring systems 102 also communicate with a topology service 106 that receives topologies from monitoring systems 102 and creates topology data structures that are stored in a topology store 108.

The RCA engine 100 also communicates with the topology service 102. In various embodiments, the RCA engine 100 receives a topology data structure from the topology service 106 and determines rules and policies based on the topology data structure and stores them in rule and policy database 110. The RCA engine 100 also configures correlation domains and stores the correlation domains in correlation domains database 112.

Figure 2A:
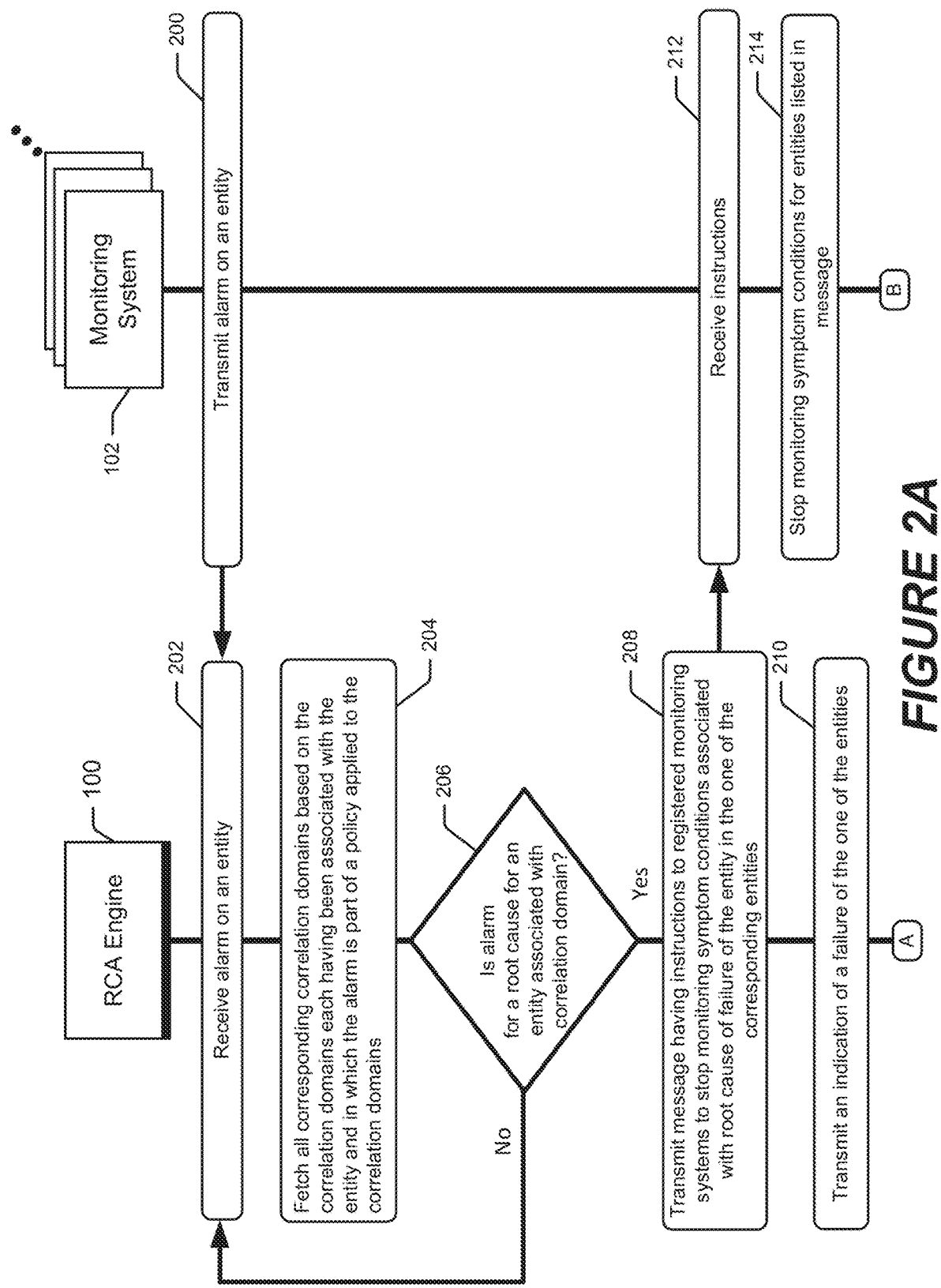
FIGS. 2A-2B are an exemplary signaling diagram for illustrating procedures according to an embodiment.
Figure 2B:
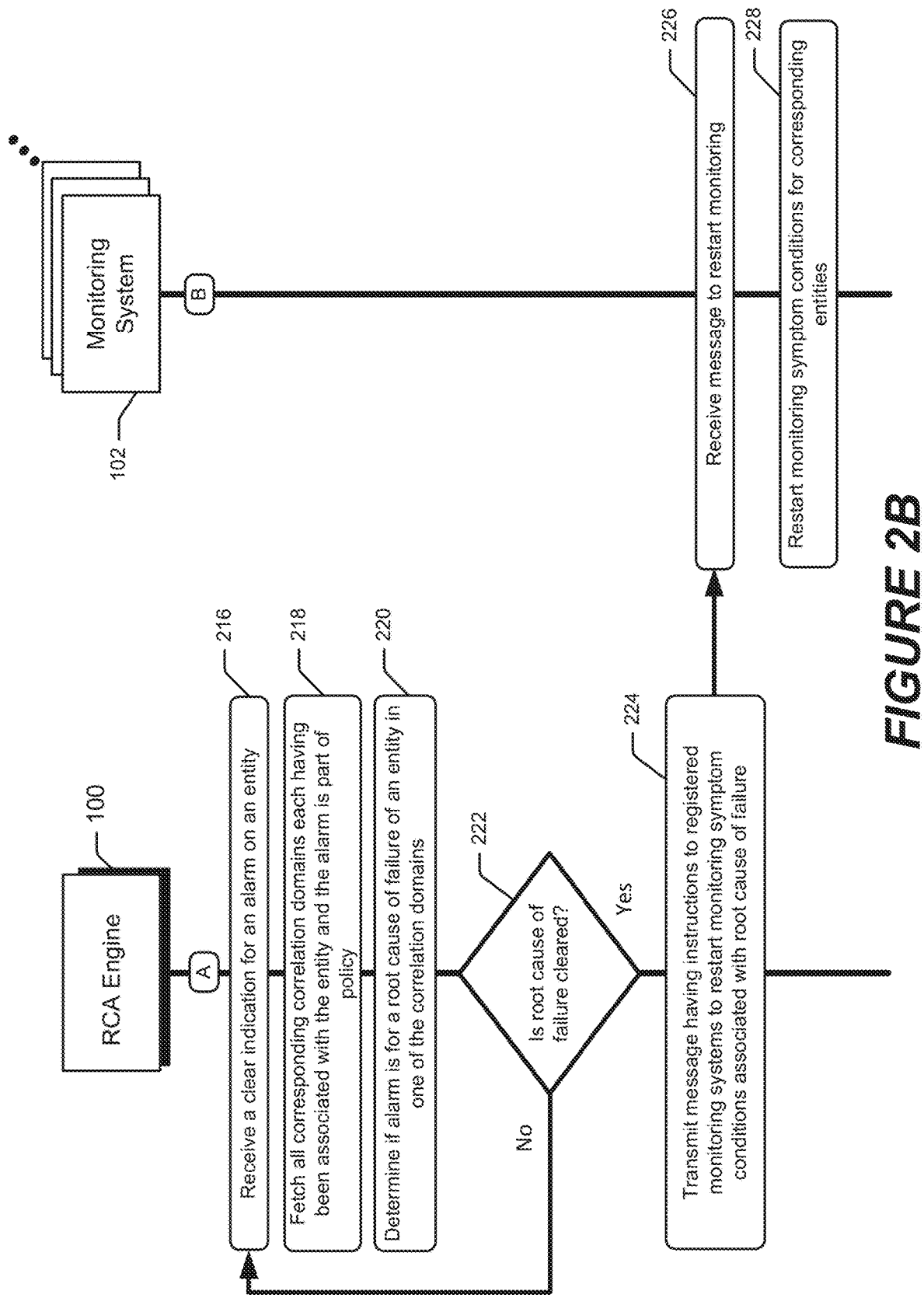

As further described in FIGS. 2A and 2B, the RCA engine 100 communicates with monitoring systems 102. FIGS. 2A and 2B are a signaling diagram of an exemplary procedure that includes controlling monitoring systems 102 to stop or start monitoring entities 104 monitored by the monitoring systems 102. The procedures of FIGS. 2A and 2B involve the RCA engine 100, and monitoring systems 102.

Initially at step 200, one of the monitoring systems 102 transmits an alarm on an entity 104. The RCA engine 100 receives the alarm on the entity 104 at step 202. At step 204, the RCA engine 100 fetches all corresponding correlation domains based on the correlation domains each having been associated with the entity 104 and in which the alarm is part of a policy applied to the correlation domains. Each correlation domain is a set of entities 104 which are inter-related. An entity 104 may be affected by another entity 104 based on a condition.

In an embodiment, the RCA engine 100 configures the correlation domain. Turning to FIG. 3, at step 300, the RCA engine 100 configures the correlation domain based on accessing a topology data structure that defines a plurality of entities 104 including the entity 104 having the alarm in step 202. Configuration of the correlation domain generates a correlation data structure identifying entities 104 of the plurality of entities 104 with indicated correlations to rules and a policy applied to the correlation domain.

Figure 14:
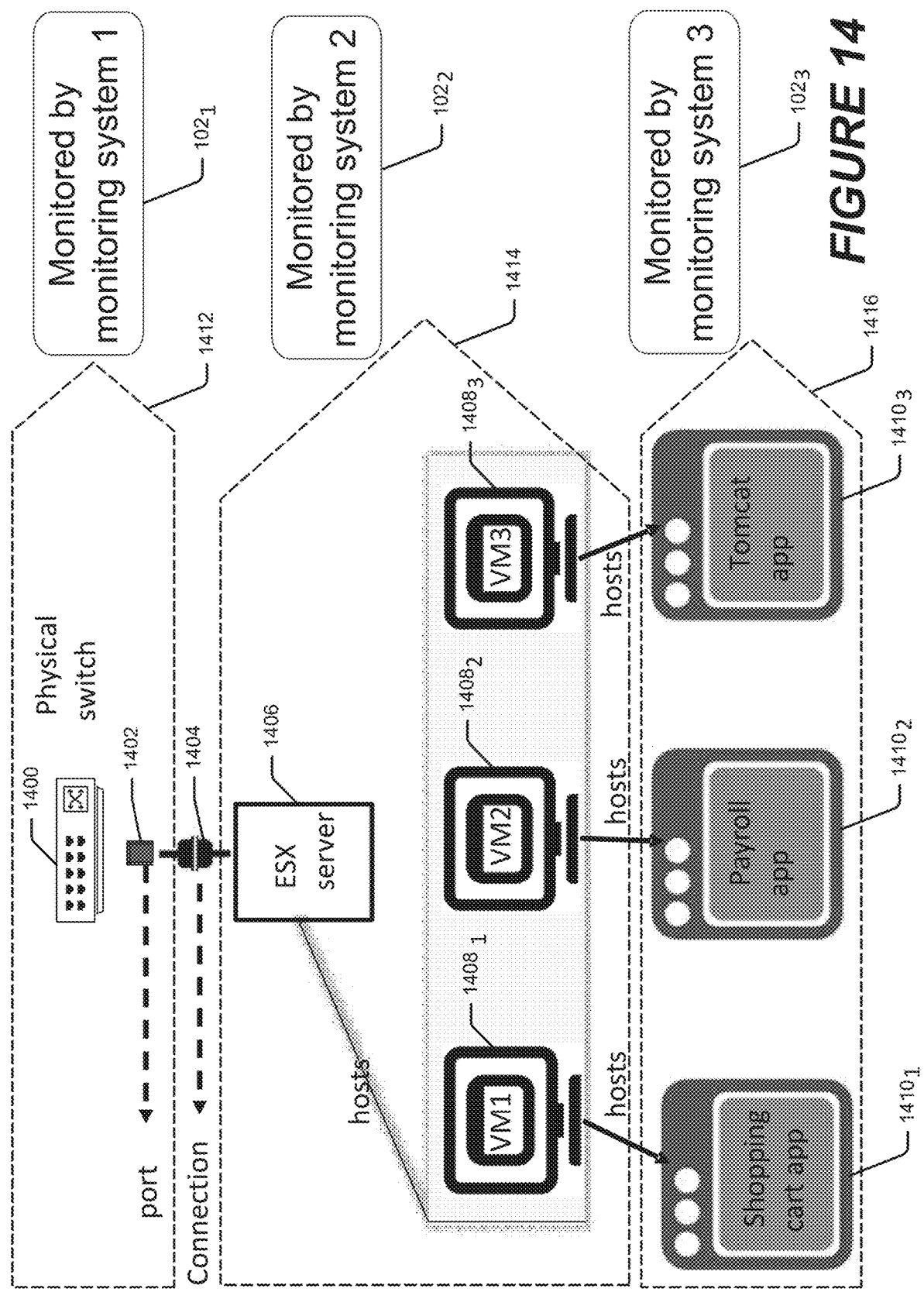
FIG. 14 is a block diagram illustrating a topology data structure of components being monitored by monitoring systems according to some embodiments.

The topology data structure in one embodiment is created by the topology service 106. Turning to FIG. 3, a monitoring system 102 at step 400 monitors entities 104. At step 402, the monitoring system 102 builds a topology for the entities 104 the monitoring system 102 is monitoring. The topology identifies entities 104 and connections of the entities 104 the monitoring system 102 is monitoring. The topology is transmitted to the topology service at step 404 and is received by the topology service at step 406. Turning now to FIG. 14, examples of topologies are illustrated. Monitoring system $102_1$ monitors physical switch 1400 and port 1402 of the physical switch 1400. Monitoring system $102_2$ monitors ESX server 1406 (a product server from VMware that is used for server virtualization) and virtualization machine hosts $1408_1$, $1408_2$, and $1408_3$. Monitoring system $102_3$ monitors applications $1410_1$, $1410_2$, and $1410_3$. Monitoring system $102_1$ transmits, to topology service 106, topology 1412 that describes the physical switch 1400 and its port 1402 that are being monitored by monitoring system $102_1$. Monitoring system $102_2$ transmits, to topology service 106, topology 1414 that describes the connection 1404, ESX server 1406, virtualization machine hosts $1408_1$, $1408_2$, and $1408_3$ and their connections, all of which are monitored by monitoring system $102_2$. Monitoring system $102_3$ transmits, to topology service 106, topology 1416 that describes applications $1410_1$, $1410_2$, and $1410_3$ and their connections, all of which are monitored by monitoring system $102_3$.

Figure 4:
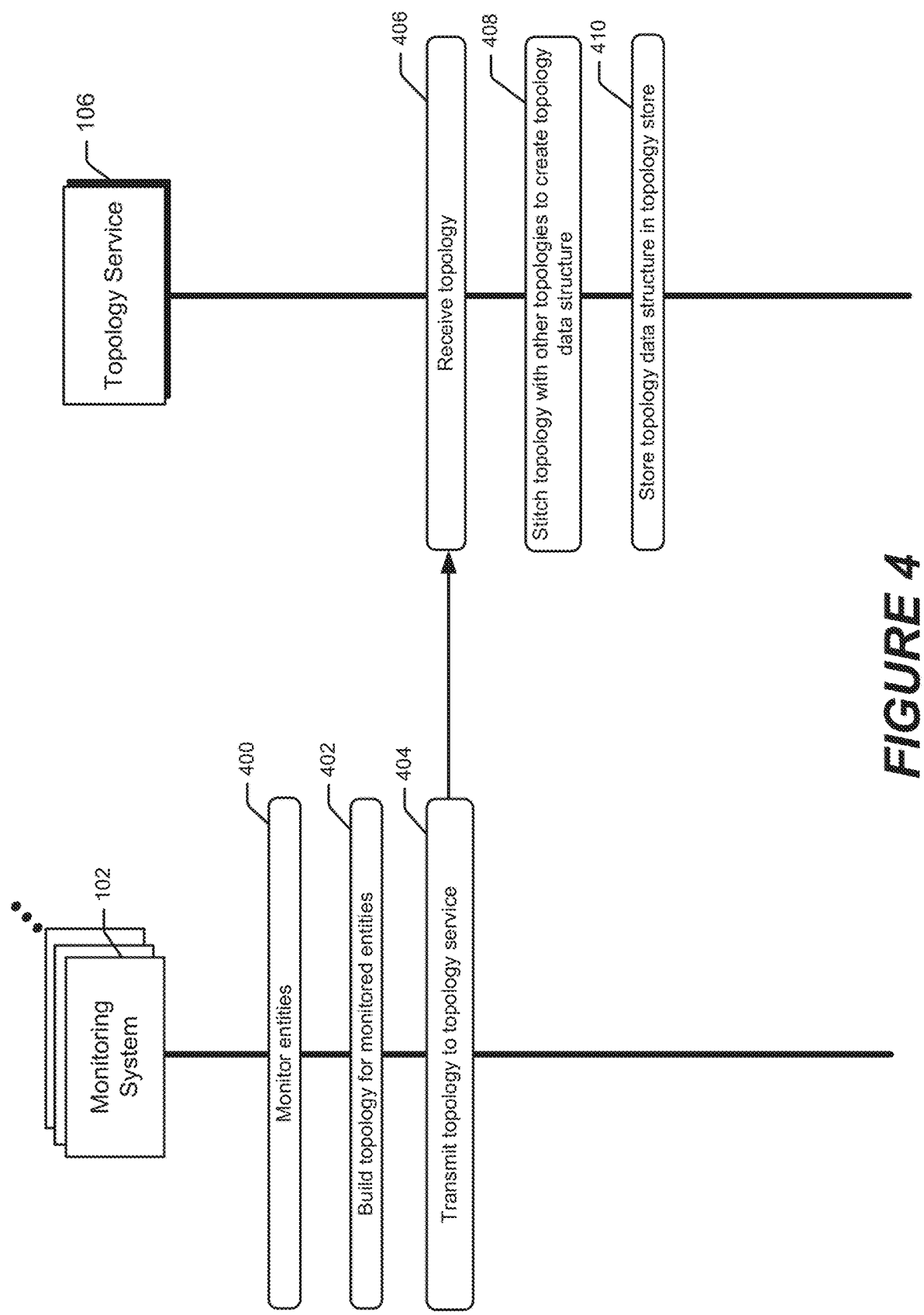
FIG. 4 is a signaling diagram illustrating operations to create and store a topology data structure according to some embodiments.

Returning to FIG. 4, at step 408, the topology service stitches the topology with other topologies received by other monitoring systems 102 to create a topology data structure. An example of a topology data structure is illustrated in FIG. 14. The topology data structure combines (i.e., stitches together) topologies 1412, 1414, and 1416 and provides how the topologies are connected as illustrated in FIG. 14. At step 410, the topology service 106 stores the topology data structure in the topology store 108.

Figure 6:
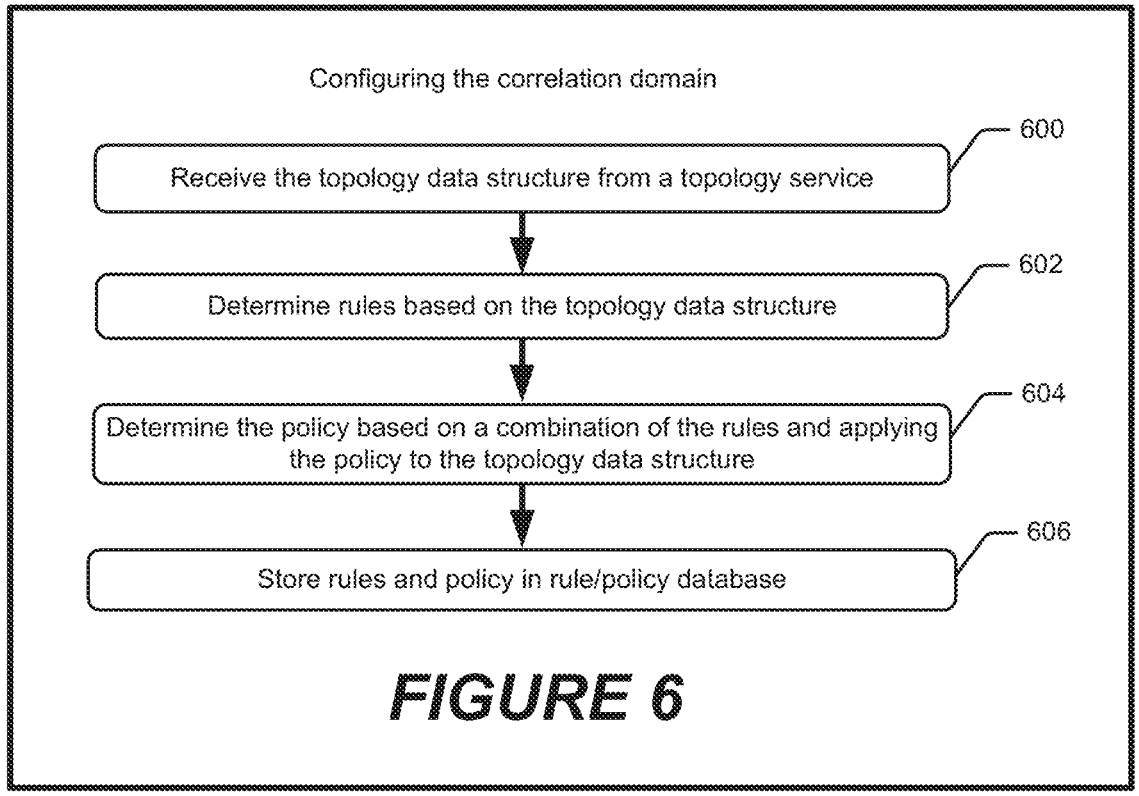
FIG. 6 is a flowchart illustrating operations to configure the correlation domain according to some embodiments.

Turning to FIGS. 5 and 6, the correlation domain can be configured in various ways. In the embodiment illustrated in FIG. 5, the RCA engine 100 receives configuration data through the network interface of the RCA engine 100. The configuration data describes how the entities 104 are inter-related, failure modes of the entities 104, connections, between entities 104, rules, etc. The RCA engine 100 configure the correlation domain based on the topology data structure and the configuration data.

In the embodiment described in FIG. 6, at step 600, the RCA engine 100 receives the topology data structure from the topology service 106. The RCA engine 100 determines rules based on the topology data structure at step 602. Some of the rules may be received from a registered monitoring system 102 or a network interface of the RCA engine 100. A rule defines alarms that are for root causes of failures of an entity 104 or a connection and alarms that are symptoms of the root cause of failure of an entity 104 or a connection. The rules are based on knowledge the RCA engine 100 has from root cause analyses of failures that identifies the root cause and symptoms for a specific situation. For example, if alarm/event "A" occurs and alarm/event "B" occurs on entities 104 in a correlation domain, the "A" is the root cause of failure and "B" is a symptom. There can be multiple rules that are created for the entities 104 and connections in the correlation domain.

At step 604, a policy is determined based on a combination of the rules and is applied to the topology data structure of the correlation domain. For example, the policy can be a combination of rules numbering anywhere from 2 rules to n rules. The rules and policy are stored in rule/policy database 110. The correlation domain is stored in correlation domain database 112 at step 606.

Figure 7:
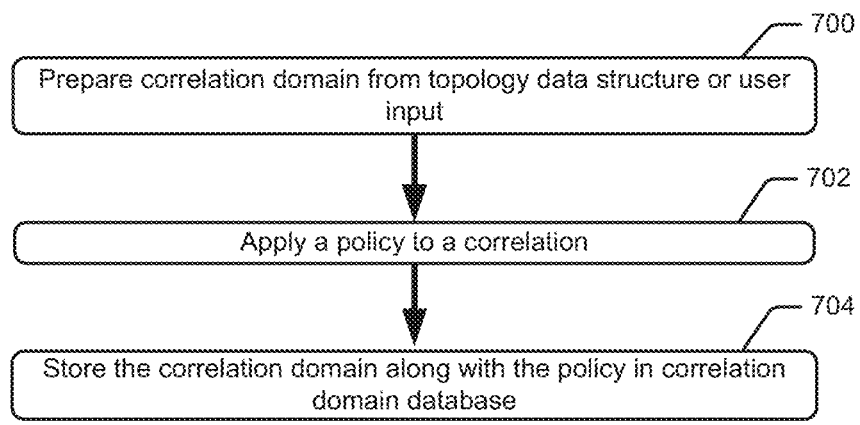
FIG. 7 is a flowchart illustrating operations to prepare a correlation domain and apply a policy to the correlation domain according to some embodiments.

In the embodiment described in FIG. 7, the correlation domain is prepared from topology data structure or from user input at step 700. At step 702, a policy is applied to correlations in the correlation domain. The correlation domain and the policy are stored in the correlation domain database 112.

Figures 8, 9, 10:
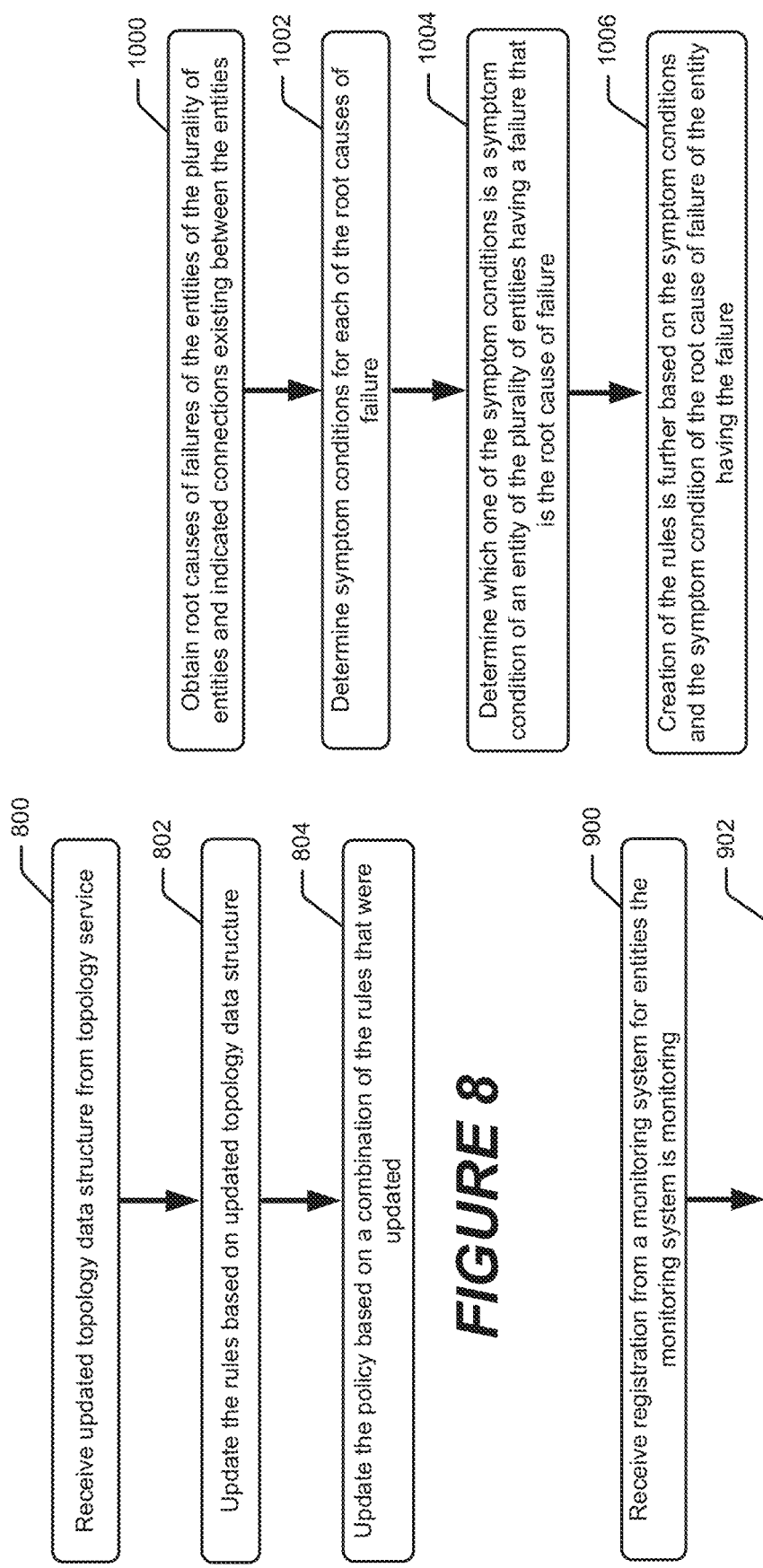
FIG. 8 is a flowchart illustrating operations to updating rules and a policy based on an updated topology data structure according to some embodiments.
FIG. 9 is a flowchart illustrating operations to register a monitoring system according to some embodiments.
FIG. 10 is a flowchart illustrating operations to determine symptom conditions for root causes of failures according to some embodiments.

The topology data structure is a dynamic structure. For example, a monitoring system 102 may add or remove an entity 104 the monitoring system 102 is monitoring. When this occurs, the monitoring system 102 provides an updated topology to the topology service 106. The topology service 106 updates the topology data structure based on changes of topologies provided by the monitoring systems 102. Turning now to FIG. 8, the RCA engine 100 receives an updated topology data structure from the topology service 106 at step 800. At step 802, the RCA engine 100 updates the rules based on the updated topology data structure. The updating may include newly created rules. At step 804, the policy is updated based on a combination of the rules that were updated.

Returning to FIG. 2A, at step 206, a determination is made as to whether the alarm is for a root cause of failure for an entity 104 associated with one of the correlation domains that were fetched. If the alarm is not for a root cause of failure, the RCA engine 100 waits until another alarm on an entity 104 is received. If the alarm is for a root cause of failure, the RCA engine 100 at step 208 transmits a message to registered monitoring systems 102 associated with the one of the correlations domains. The message contains instructions for the registered monitoring systems 102 to stop monitoring symptom conditions associated with the root cause of failure for entities 104 in the one of the corresponding entities 104. At step 210, the RCA engine 100 transmits an indication of a failure of the entity 104 that has failed. For example, the RCA engine 100 transmits the indication of the failure to terminals of repair technicians responsible for the entity 104 that has failed. The indication of the failure may also be sent to other terminals, such as buyers that keep stock of entities 104, manufacturers that track failures, etc.

Monitoring systems 102 become registered by sending a registration request to the RCA engine 100. The registration request contains an identification of the entities 104 the monitoring system 102 is monitoring. Turning now to FIG. 9, the RCA engine 100 receives a registration request at step 900. At step 902, the RCA 100 engine adds the monitoring system 102 to a subscription list for correlation domains in which entities 104 the monitoring system 102 is monitoring exists in the correlation domain.

Turning to FIG. 10, in order to determine whether the alarm is for a root cause of failure, in one embodiment, the RCA engine 100 obtains root causes of failures of entities 104 of the plurality of entities 104 in a correlation domain at step 1000. The root causes of failures of entities 104 is based on root cause analyses the RCA engine 100 previously performed of failures of entities 104. At step 1002, the RCA engine 100 determines symptom conditions for each of the root cause of failure. The determination may be made based on knowledge the RCA engine 100 has from previously performed RCA analyses. At step 1004, the RCA engine 100 determines which one of the symptom conditions is a symptom condition of an entity 104 of the plurality of entities 104 that is the root cause of failure. This information is stored in a database. At step 1006, the rules are further based on the symptom conditions and the symptom condition of the root cause of failure of the entity 104 having the failure.

Returning to FIG. 2A, at step 212, the monitoring system 102 receives the instructions. At step 214, the monitoring system 102 stops monitoring symptom conditions for entities 104 listed in the message.

Turning now to FIG. 2B, at step 216, the RCA engine 100 receives a clear for a previous issued alarm on an entity 104. The entity 104 of step 216 may be the same entity 104 of the entity 104 of step 202. At step 218, the RCA engine 100 fetches all corresponding correlation domains in which the entity 104 exists (i.e., is associated with the corresponding correlation domains) and the alarm is part of the policy. At step 220, a determination is made if the alarm is for a root cause of failure of an entity 104 in one of the correlation domains.

At step 222, if the root cause is not cleared, the RCA engine 100 returns to step 214 and waits for another clear for an alarm on an entity 104. If the root cause is cleared, the RCA engine 100 at step 224 transmits a message to registered monitoring systems 102 in the subscription list(s) for the corresponding correlation domain(s). The message contains instructions to restart monitoring symptom conditions for entities 104 in the corresponding correlation domains.

The monitoring system 102 receives the message to restart monitoring at step 226. At step 228, the monitoring system 102 restarts monitoring symptom conditions for corresponding entities 104 in which monitoring was stopped.

Turning now to FIG. 11, operations of the monitoring system 102 shall now be described. At step 1100, the monitoring system 102 transmits a registration request to the RCA engine 100 for monitoring instructions (e.g., start or stop monitoring) for entities 104 and connections monitored by the monitoring system 102. At step 1102, the monitoring system 102 monitors the entities 104. At step 1104, the monitoring system 102 receives a message from the RCA engine 100. The message contains instructions to stop monitoring entities 104 listed in the message. The list of entities 104 may be a list specific to a monitoring system 102 or may be a list of all entities 104 in which monitoring symptoms is to be stopped. At step 1106, the monitoring system 102 stops monitoring symptom conditions of entities 104 listed in the list that the monitoring system 102 is monitoring responsive to receiving the message.

Turning to FIG. 12, the monitoring system 102 also receives messages to restart or resume monitoring symptom conditions. At step 1200, a second message is received from the RCA engine 100. The second message contains instructions to resume monitoring entities 104 listed in the second message. At step 1202, responsive to receiving the second message, the monitoring system 102 resumes or restarts monitoring entities 104 the monitoring system 102 is monitoring that is listed in the second message.

Turning to FIG. 13, the monitoring system 102 also provides clear alarms to the RCA engine 100. At step 1300, the monitoring system 102 transmits an alarm on a monitored entity 104 to the RCA engine 100. At step 1302, the monitoring system 102 receives, from the RCA engine 100, a third message having instructions to stop monitoring the monitored entity 104. At step 1304, responsive to receiving an input from an interface to transmit a clear alarm for the monitored entity 104, the monitoring system 102 transmits a clear alarm to the RCA engine 100. For example, a technician that has repaired the entity 104 may provide an input to transmit a clear alarm.

At step 1306, the monitoring system 102 receives, from the RCA engine 100, a fourth message having instruction to resume monitoring of the monitored entity 104. At step 1308, response to receiving the fourth message, the monitoring system 102 resumes monitoring of the monitored entity 104.

An example of how the RCA engine 100 receives an alarm and provides the messages to the monitoring system 102 to stop monitoring and resume monitoring shall now be described. Turning now to FIG. 14, monitoring system $102_1$ monitors physical switch 1400 and port 1402 at an interval of, for example, five minutes. Monitoring system $102_2$ monitors ESX server 1406 (a product server from VMware that is used for server virtualization) and virtualization machine (VM) 1408₁, 1408₂, and 1408₃ at the five minute interval. Monitoring system 102₃ monitors applications 1410₁, 1410₂, and 1410₃. At the five minute interval. The monitoring intervals could be longer and different for each monitoring system 102 and each entity being monitored. Assume a situation where the port 1402 on physical switch 1400 has failed or goes "off."

Monitoring system 102₁ will transmit an alarm on the port 1402. Monitoring system 102₂ will transmit an alarm on each of ESX server 1406 and VM 1408₁, 1408₂, and 1408₃ as the monitoring system 102₂ is unable to contact them. Monitoring system 102₃ will transmit an alarm on each of the applications 1410₁, 1410₂, and 1410₃ as monitoring system 102₃ is unable to contact them. The RCA engine 100 receives the alarms from the three monitoring systems 102₁, 102₂, and 102₃. For each of the alarms from monitoring system 102₂ and 102₃, the RCA engine 100 fetches all corresponding correlation domains based on the correlation domains each having been associated with the entities 1406, 1408₁, 1408₂, and 1408₃, or entities 1410₁, 1410₂, and 1410₃, respectively and in which the alarms are part of a policy applied to the corresponding correlation domains. The RCA engine 100 determines that these alarms are not for a root cause of failure of any of the entities 1406, 1408₁, 1408₂, and 1408₃, or entities 1410₁, 1410₂, and 1410₃, respectively. For example, the policy for correlation domains associated with entities 1406, 1408₁, 1408₂, and 1408₃ may have a rule that indicates that if there are alarms for all of the entities 1406, 1408₁, 1408₂, and 1408₃, then the alarms are for a symptom condition and are not alarms for a root cause failure. The policy for correlation domains associated with entities 1410₁, 1410₂, and 1410₃ may have a similar rule that indicates that if there are alarms for all of the entities 1410₁, 1410₂, and 1410₃, then the alarms are for a symptom condition and are not alarms for a root cause failure. The RCA engine 100 transmits a message to monitoring system 102₂ having instructions for the monitoring system 102₂ to stop monitoring symptom conditions for entities 1406, 1408₁, 1408₂, and 1408₃. The RCA engine 100 transmits a message to monitoring system 1023 having instructions for the monitoring system 1023 to stop monitoring symptom conditions for entities 1410₁, 1410₂, and 1410₃. The message to the monitoring system 102₂ and the message to the monitoring system 102₃ may be the same message or different messages. Responsive to receiving the message, the monitoring systems 102₂, 102₃ stop monitoring symptom conditions for entities 1406, 1408₁, 1408₂, 1408₃, 1410₁, 1410₂, and 1410₃.

For the alarm from monitoring system 102₁, the RCA engine 100 fetches all corresponding correlation domains based on the correlation domains each having been associated with the entity (i.e., port 1402) and in which the alarm is part of policy applied to the corresponding correlation domain. The RCA engine 100 determines the alarm is for a root cause failure of the port 1402. For example, the policy for correlation domains associated with entity 1402 may have a rule that if there are alarms for entities 1404, 1406, 1408₁, 1408₂, 1408₃, 1410₁, 1410₂, and 1410₃ and there are no alarms for entity 1400, then the alarm for port 1402 is an alarm for a root cause failure of the port 1402. The RCA engine 100 transmits an indication of a failure of port 1402 to terminals of users, such as technicians, that are responsible for the port 1402. The RCA engine 100 also transmits a message to monitoring system 102₁ having instructions to stop monitoring symptom conditions of port 1402.

Once the port 102 has been repaired, the RCA engine 100 will receive a clear alarm for the port 1402 from monitoring system 102₁. The RCA engine 100 will transmit a message to monitoring system 102₂ having instructions for the monitoring system 102₂ to resume monitoring symptom conditions for entities 1406, 1408₁, 1408₂, and 1408₃. The RCA engine 100 transmits a message to monitoring system 102₃ having instructions for the monitoring system 102₃ to resume monitoring symptom conditions for entities 1410₁, 1410₂, and 1410₃. The message to the monitoring system 102₂ and the message to the monitoring system 102₃ may be the same message or different messages. Responsive to receiving the message, the monitoring systems 102₂, 102₃ resumes monitoring symptom conditions for entities 1406, 1408₁, 1408₂, 1408₃, 1410₁, 1410₂, and 1410₃.

The root cause of failure may be for an entity 104 that is not being monitored by monitoring systems 102₁, 102₂, or 102₃. For example, the power for entities 1400-1410 may be provided by the same power supply, which is monitored by a different monitoring system 102. When there is a failure in the power supply, the monitoring systems 102₁, 102₂, and 102₃ will be transmitting alarms for each of the entities 1400-1410. The RCA engine 100 will receive the alarms from monitoring systems 102₁, 102₂, and 102₃ and determine that none of the alarms are for a root cause of failure. For example, the policy associated with the entities 1400-1410 may have a rule that indicates that if every one of the entities 1400-1410 have an alarm, then the alarms are for symptom conditions and not a root cause of failure. The RCA engine 100 will transmit one or more messages to the monitoring systems 102₁, 102₂, and 102₃ having instructions to stop monitoring the symptom conditions for the entities 1400-1410. The RCA engine 100 will receive the alarm for the power supply and determine the alarm is for a root cause of failure. After the power supply is repaired or replaced, the RCA engine 100 will receive a clear alarm for the power supply. The RCA engine 100 will then send one or more messages to the monitoring systems 102₁, 102₂, and 102₃ having instructions to resume monitoring the symptom conditions for the entities 1400-1410. The monitoring systems 102₁, 102₂, and 102₃ will then resume monitoring the symptom conditions for the entities 1400-1410.

Figure 15:
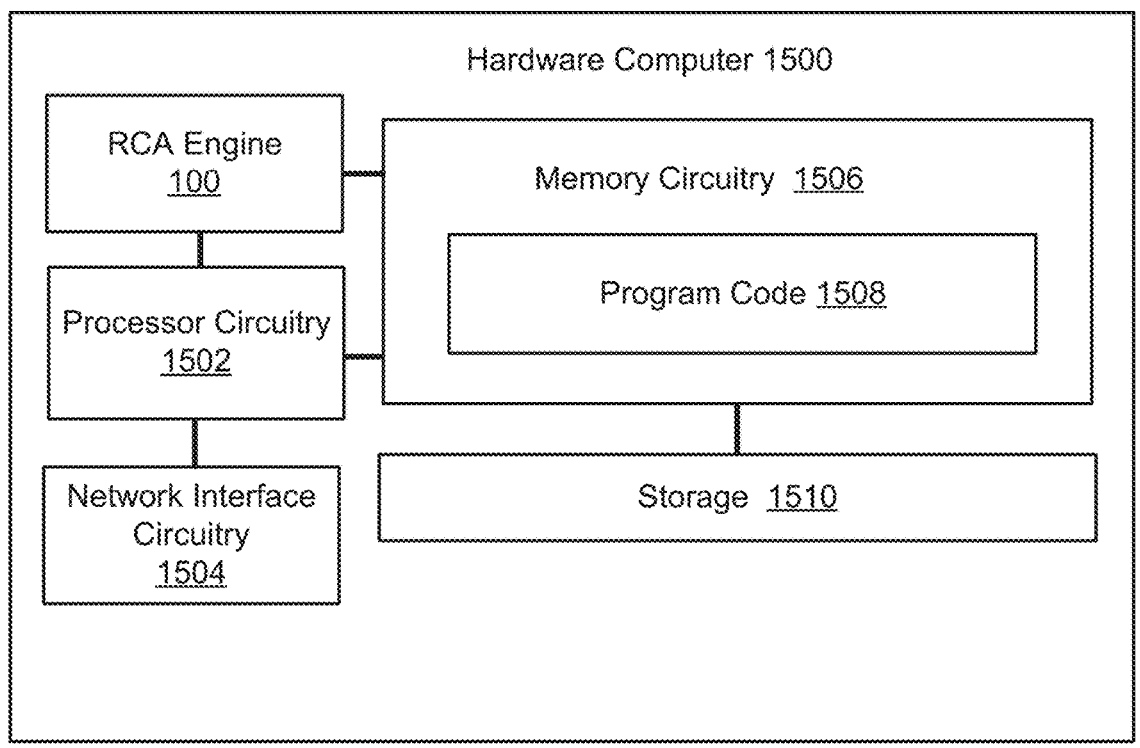
FIG. 15 is a block diagram of a hardware computer having an RCA engine according to some embodiments.

FIG. 15 provides an overview diagram of a suitable computer hardware and computing environment in conjunction with which various embodiments of the RCA engine 100 may be practiced. The description of FIG. 15 is intended to provide a brief, general description in conjunction with which the subject matter described herein may be implemented. In some embodiments, the subject matter is described in the general context of computer-executable instructions, such as program modules, being executed by a computer, such as a personal computer. Generally, program modules include routines, programs, objects, components, data structures, and the like, that perform particular functions described above. Moreover, those skilled in the art will appreciate that the subject matter may be practiced with other computer system configurations, including hand-held devices, multiprocessor systems, microprocessor-based or programmable consumer electronics, network PCs, minicomputers, mainframe computers, and the like. As used herein, a "processor" includes one or more processors, microprocessors, computers, co-processors, graphics processors, digital signal processors, arithmetic logic units, system-on-chip processors, etc. The subject matter may also be practiced in distributed computer environments where tasks are performed by I/O remote processing devices that are linked through a communications network. In a distributed computing environment, program modules may be located in both local and remote memory storage devices.

In the embodiment shown in FIG. 15, a hardware and operating environment is provided that is applicable to the RCA engine 100 shown in the other figures. As shown in FIG. 15, one embodiment of the hardware and operating environment includes processing circuitry 1502 having one or more processing units coupled to the network interface circuitry 1504 and a memory circuitry 1506. The memory circuitry 1506 may include a ROM, e.g., a flash ROM, a RAM, e.g., a DRAM or SRAM, or the like and includes suitably configured program code 1508 to be executed by the processing circuitry so as to implement the above described functionalities of the RCA engine 100. The storage 1510 may include a mass storage, e.g., a hard disk or solid-state disk, or the like. There may be only one or more than one processing unit, such that the processor circuitry 1502 comprises a single central-processing unit (CPU), or a plurality of processing units, commonly referred to as a multiprocessor or parallel-processor environment. A multiprocessor system can include cloud computing environments. In the illustration shown, the RCA engine 100 is part of hardware computer 1500. In alternate embodiments, the RCA engine 100 is a stand-alone device that has the processor circuity 1502, the network interface circuity 1504, the memory circuitry 1605 having program code 1508 and storage 1510.

Figure 16:
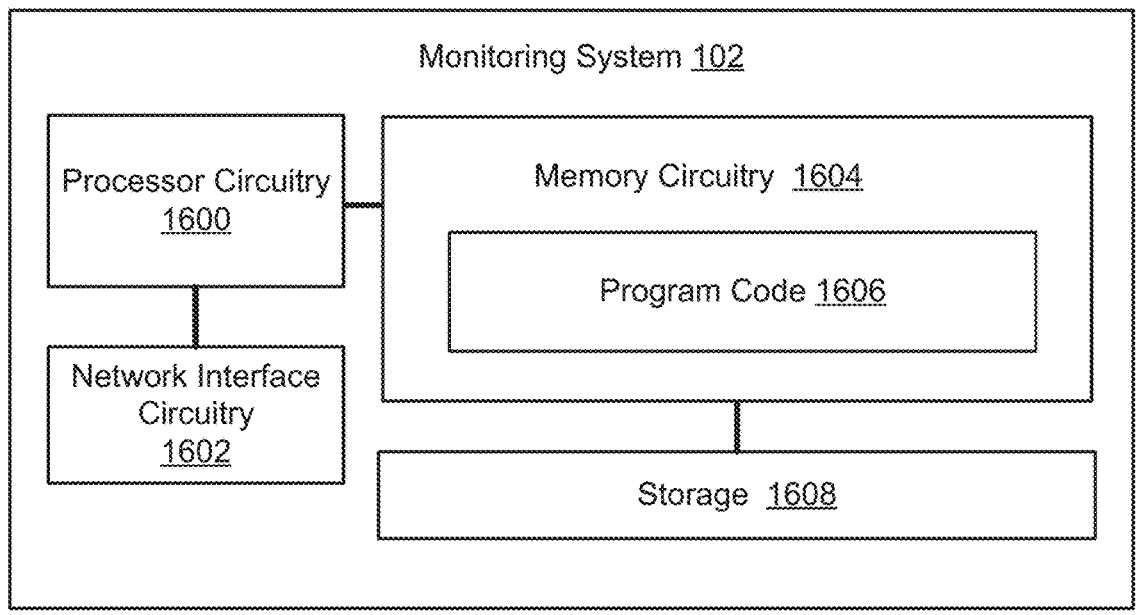
FIG. 16 is a block diagram of components of a monitoring system according to some embodiments.

FIG. 16 provides an overview diagram of a suitable computer hardware and computing environment in conjunction with which various embodiments of monitoring system 102 may be practiced. The description of FIG. 16 is intended to provide a brief, general description in conjunction with which the subject matter may be implemented. In some embodiments, the invention is described in the general context of computer-executable instructions, such as program modules, being executed by a computer, such as a personal computer. Generally, program modules include routines, programs, objects, components, data structures, and the like, that perform particular tasks or implement particular abstract data types.

In the embodiment shown in FIG. 16, a hardware and operating environment is provided that is applicable to the toll booth component operations described in the other figures and described above. Moreover, those skilled in the art will appreciate that the subject matter may be practiced with other computer system configurations, including handheld devices, multiprocessor systems, microprocessor-based or programmable consumer electronics, network PCs, minicomputers, mainframe computers, and the like. As used herein, a "processor" includes one or more processors, microprocessors, computers, co-processors, graphics processors, digital signal processors, arithmetic logic units, system-on-chip processors, etc. The subject matter may also be practiced in distributed computer environments where tasks are performed by I/O remote processing devices that are linked through a communications network. In a distributed computing environment, program modules may be located in both local and remote memory storage devices.

In the embodiment shown in FIG. 16, a hardware and operating environment is provided that is applicable to the monitoring system 102 shown in the other figures. As shown in FIG. 16, one embodiment of the hardware and operating environment includes processing circuitry 1600 having one or more processing units coupled to the network interface circuitry 1602 and a memory circuitry 1604. The memory circuitry 1604 may include a ROM, e.g., a flash ROM, a RAM, e.g., a DRAM or SRAM, or the like and includes suitably configured program code 1606 to be executed by the processing circuitry so as to implement that above described functionalities of the monitoring system 102. The storage 1608 may include a mass storage, e.g., a hard disk or solid-state disk, or the like. Storage 1608 includes database 202 that stores the tollway transponder identifier, registered terminal information associated with the tollway transponder identifier, and account information associated with the tollway transponder identifier. For example, there may be an entry for each tollway transponder identifier containing the tollway transponder identifier, associated registered terminal information, and associated account information. There may be only one or more than one processing unit, such that the processor circuitry 1600 of toll booth 104 comprises a single central-processing unit (CPU), or a plurality of processing units, commonly referred to as a multiprocessor or parallel-processor environment. A multiprocessor system can include cloud computing environments.

Figure 17:
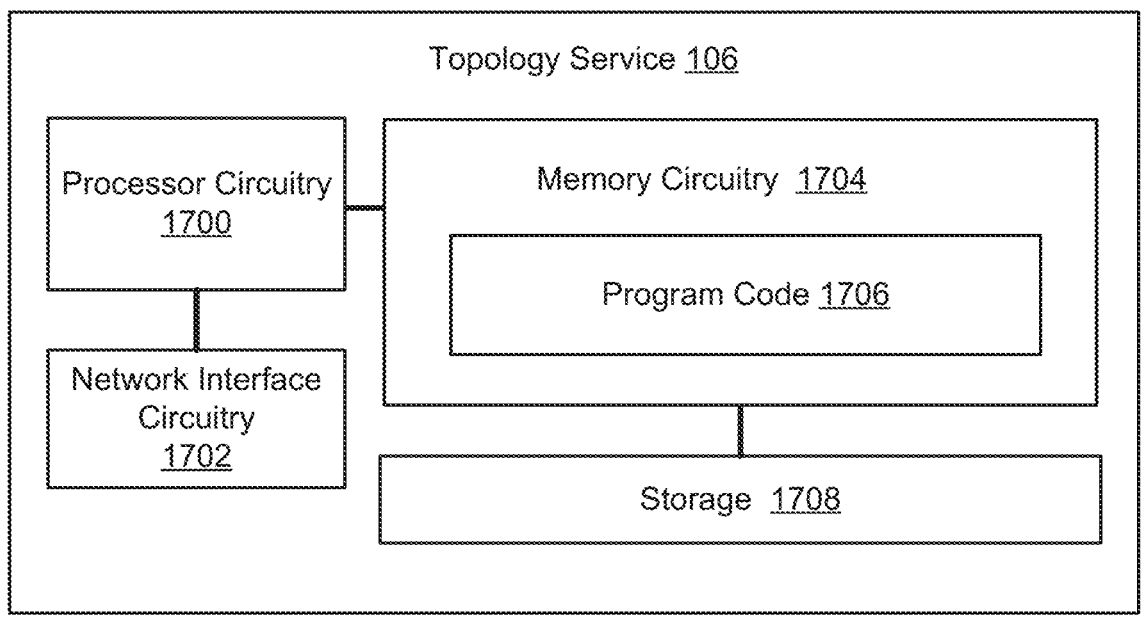
FIG. 17 is a block diagram of a topology service according to some embodiments.

FIG. 17 provides an overview diagram of a suitable computer hardware and computing environment in conjunction with which various embodiments of the topology service 106 may be practiced. The description of FIG. 17 is intended to provide a brief, general description in conjunction with which the subject matter may be implemented. In some embodiments, the subject matter is described in the general context of computer-executable instructions, such as program modules, being executed by a computer, such as a personal computer. Generally, program modules include routines, programs, objects, components, data structures, and the like, that perform particular tasks or implement particular abstract data types.

In the embodiment shown in FIG. 17, a hardware and operating environment is provided that is applicable to the topology operations described in the other figures and described above. Moreover, those skilled in the art will appreciate that the subject matter may be practiced with other computer system configurations, including multiprocessor systems, microprocessor-based or programmable consumer electronics, network PCs, minicomputers, mainframe computers, and the like. As used herein, a "processor" includes one or more processors, microprocessors, computers, co-processors, graphics processors, digital signal processors, arithmetic logic units, system-on-chip processors, etc. The subject matter may also be practiced in distributed computer environments where tasks are performed by I/O remote processing devices that are linked through a communications network. In a distributed computing environment, program modules may be located in both local and remote memory storage devices.

In the embodiment shown in FIG. 17, a hardware and operating environment is provided that is applicable to the topology service 106 shown in the other figures. As shown in FIG. 17, one embodiment of the hardware and operating environment includes processing circuitry 1700 having one or more processing units coupled to the network interface circuitry 1702 and a memory circuitry 1704. The memory circuitry 1704 may include a ROM, e.g., a flash ROM, a RAM, e.g., a DRAM or SRAM, or the like and includes suitably configured program code 1706 to be executed by the processing circuitry so as to implement that above described functionalities of the registered terminal. The storage 1708 may include a mass storage, e.g., a hard disk or solid-state disk, or the like. There may be only one or more than one processing unit, such that the processor circuitry 1700 of topology service 106 comprises a single central-processing unit (CPU), or a plurality of processing units, commonly referred to as a multiprocessor or parallel-processor environment. A multiprocessor system can include cloud computing environments.

Thus, example systems, methods, and tangible non-transitory machine readable media for controlling monitoring systems to stop and start monitoring have been described. The advantages provided include reduction in network load of the monitoring systems, reduction in network load of systems using events/alarms provided by the monitoring systems, and the like.

As will be appreciated by one of skill in the art, the present inventive concepts may be embodied as a method, data processing system, or computer program product. Furthermore, the present inventive concepts may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations or block diagrams of methods, systems and computer program products. It will be understood that each block of the flowchart illustrations or block diagrams, and combinations of blocks in the flowchart illustrations or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations described herein may be written in an object-oriented programming language such as Java® or C++. However, the computer program code for carrying out operations described herein may also be written in conventional procedural programming languages, such as the "C" programming language. The program code may execute entirely on the user's computer, partly on the user's computer, as a standalone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments and, although specific terms are employed, they are used in a generic and descriptive sense only and not for purposes of limitation, the scope of the inventive concepts being set forth in the following claims.

What is claimed is:

1. A method in a root cause analysis (RCA) engine of a networked hardware computer, the method comprising:
   receiving an alarm on an entity;
   fetching correlation domains based on the correlation domains each having been associated with the entity and in which the alarm is part of a policy applied to the correlation domains, wherein each of the correlation domains has a plurality of entities and a subscription list identifying which monitoring systems are monitoring each of the plurality of entities;
   receiving a registration request from one of the monitoring systems, the registration request having a list of monitored entities the one of the monitoring systems is monitoring;
   responsive to receiving the registration request, for each of the correlation domains in which the entity in the list of monitored entities exists, adding the one of the monitoring systems to the subscription list;
   determining if the alarm is for a root cause of failure for one of the plurality of entities associated with one of the correlation domains; and
   responsive to the alarm being for a root cause of failure for the one of the plurality of entities associated with the one of the correlation domains, transmitting, via a network interface, a message to registered monitoring systems for the one of the correlation domains, the message comprising an instruction for the registered monitoring systems to stop monitoring symptom conditions associated with the root cause of failure for the one of the plurality of entities associated with the one of the correlation domains.

2. The method of claim 1, further comprising:
   for each correlation domain of the correlation domains:
   configuring the correlation domain based on accessing a topology data structure that defines the plurality of entities including the entity and an indication of connections existing between entities of the plurality of entities, wherein configuration of the correlation domain generates a correlation data structure identifying entities in the plurality of entities with indicated correlations and a policy applied to the correlation domain.

3. The method of claim 2 wherein configuring the correlation domain based on accessing the topology data structure comprises receiving configuration data through the network interface of the RCA engine and configuring the correlation domain based on the topology data structure and the configuration data.

4. The method of claim 2, wherein configuring the correlation domain based on accessing the topology data structure comprises:
receiving the topology data structure from a topology service;
determining rules based on the topology data structure; and
determining the policy for the one of the correlation domains based on a combination of the rules and applying the policy to the topology data structure.

5. The method of claim 4, further comprising:
receiving an updated topology data structure from the topology service;
responsive to receiving the updated topology data structure:
updating the rules based on the updated topology data structure; and
updating the policy based on the combination of the rules that were updated.

6. The method of claim 4 further comprising:
obtaining root causes of failures of the entities of the plurality of entities and indicated connections existing between entities of the plurality of entities;
determining symptom conditions for each of the root causes of failures that are obtained;
determining which one of the symptom conditions is a symptom condition of the entity of the plurality of entities having a failure that is the root cause; and
wherein the rules are further based on the symptom conditions and the symptom condition of the entity having the failure.

7. The method of claim 4, wherein determining the rules based on the topology data structure comprises receiving at least one of the rules from one of the registered monitoring systems and the network interface of the RCA engine.

8. The method of claim 1, further comprising:
receiving a clear indication for a second alarm on a second entity;
fetching second correlation domains based on the second correlation domains each having been associated with the second entity and which the second alarm is part of a second policy applied in each of the second correlation domains;
determining if the second alarm is for a second root cause for an entity in one of the second correlation domains; and
responsive to the second alarm being for the second root cause of failure for the entity associated with the one of the second correlation domains:
determining if the second root cause of failure has been cleared;
and responsive to determining that the second root cause of failure has been cleared, transmitting, through the network interface, a second message to the registered monitoring systems for the one of the second correlation domains, the second message containing an instruction for the registered monitoring systems to restart monitoring symptom conditions associated with the second root cause of failure for the entity associated with the one of the second correlation domains.

9. The method of claim 1, wherein transmitting, through the network interface, the message to the registered monitoring systems for the one of the correlation domains comprises transmitting the message to the monitoring systems listed in the subscription list of the one of the correlation domains.

10. The method of claim 1 wherein receiving the alarm on the entity comprises receiving the alarm on the entity from one of the registered monitoring systems.

11. The method of claim 1, further comprising:
responsive to transmitting the message to the registered monitoring systems for the one of the correlation domains, stopping monitoring symptom conditions associated with the root cause of failure.

12. A root cause analysis (RCA) engine of a hardware computer, the RCA engine comprising:
a processor and a memory coupled to the processor, wherein the memory stores computer program instructions that are executed by the processor to perform operations comprising:
receiving an alarm on an entity;
fetching correlation domains based on the correlation domains each having been associated with the entity and in which the alarm is part of a policy applied to the correlation domains;
determining if the alarm is for a root cause of failure for an entity associated with one of the correlation domains;
responsive to determining that the alarm is being for the root cause of failure for the entity associated with the one of the correlation domains:
transmitting, via a network interface used by the RCA engine, a message to registered monitoring systems for the one of the correlation domains, the message comprising instructions for the registered monitoring systems to stop monitoring symptom conditions associated with the root cause of failure for the entity associated with the one of the correlation domains; and
transmitting, through a network, an indication of a failure of the entity associated with the one of the correlation domains that is the root cause of failure;
receiving a clear indication for a second alarm on a second entity;
determining if the second alarm is for a second root cause of failure for the second entity associated with one of second correlation domains; and
responsive to determining that the second alarm is for the second root cause of failure for the second entity:
determining if the second root cause of failure has been cleared; and
responsive to determining that the second root cause of failure has been cleared, transmitting, through the network interface, a second message to the registered monitoring systems for the one of the second correlation domains, the second message comprising instructions for the registered monitoring systems to restart the monitoring symptom conditions associated with the second root cause of failure.

13. The RCA engine of claim 12, wherein the entity and the entity associated with the one of the correlation domains are a same entity.

14. The RCA engine of claim 12, wherein the operations further comprise:
for each correlation domain of the correlation domains:
configuring the correlation domain based on accessing a topology data structure that defines a plurality of entities including the entity and an indication of connections existing between entities of the plurality of entities, wherein configuration of the correlation domain generates a correlation data structure identifying entities in the plurality of entities with indicated correlations and a policy applied to the correlation domain.

15. The RCA engine of claim 14 further comprising an input interface, wherein the operations further comprise:
receiving configuration data from the input interface; and
wherein configuring the correlation domain based on accessing a topology data structure comprises configuring the correlation domain based on the topology data structure and the configuration data.

16. The RCA engine of claim 14, wherein the operations further comprise:
determining rules based on the topology data structure; and
determining the policy based on a combination of the rules and applying the policy to the topology data structure.

17. The RCA engine of claim 12, wherein each of the second correlation domains has been associated with the second entity, and wherein the second alarm is part of a second policy applied in each of the second correlation domains.

18. A monitoring system comprising:
a processor and a memory coupled to the processor, wherein the memory stores computer program instructions that are executed by the processor to perform operations comprising:
transmitting a registration request to a root cause analysis (RCA) engine for monitoring instructions for entities monitored by the monitoring system;
monitoring the entities;
receiving, from the RCA engine, a message comprising an instruction to stop monitoring the entities listed in the message; and
stop monitoring the entities listed responsive to receiving the message.

19. The monitoring system of claim 18, wherein the operations further comprise:
receiving, from the RCA engine, a second message containing instructions to resume monitoring the entities listed; and
responsive to receiving the second message, resume monitoring of the entities listed.

20. The monitoring system of claim 18, wherein the operations further comprise:
transmitting an alarm on a monitored entity to the RCA engine; and
receiving a third message comprising an instruction from the RCA engine to stop monitoring the monitored entity;
responsive to receiving an input from an interface to transmit a clear alarm for the monitored entity, transmitting the clear alarm for the monitored entity to the RCA engine;
receiving, from the RCA engine, a fourth message comprising an instruction to resume monitoring of the monitored entity; and
responsive to receiving the fourth message, resume monitoring of the monitored entity.

* * * * *